United States Patent
Suzuki et al.

(10) Patent No.: US 9,267,425 B2
(45) Date of Patent: Feb. 23, 2016

(54) AIR SUPPLY DEVICE OF GAS ENGINE

(75) Inventors: Hajime Suzuki, Tokyo (JP); Yuuichi Shimizu, Tokyo (JP); Hideki Nishio, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 196 days.

(21) Appl. No.: 13/979,021

(22) PCT Filed: Sep. 30, 2011

(86) PCT No.: PCT/JP2011/072639
§ 371 (c)(1),
(2), (4) Date: Sep. 17, 2013

(87) PCT Pub. No.: WO2012/117604
PCT Pub. Date: Sep. 7, 2012

(65) Prior Publication Data
US 2014/0000255 A1    Jan. 2, 2014

(30) Foreign Application Priority Data

Feb. 28, 2011  (JP) ................................ 2011-043104

(51) Int. Cl.
*F02B 29/04* (2006.01)
*F02B 37/12* (2006.01)
(Continued)

(52) U.S. Cl.
CPC . *F02B 37/12* (2013.01); *F02D 9/02* (2013.01); *F02D 41/0007* (2013.01);
(Continued)

(58) Field of Classification Search
CPC .......... F02B 37/12; F02B 37/18; F02B 37/00; F02B 29/0406; F02D 9/02; F02D 41/0007; F02D 2200/0406; F02D 2200/0414; F02D 2200/703; F02M 21/0215; F02M 21/0218; F02M 21/0227; F02M 35/108; Y02T 10/32; Y02T 10/144

USPC ................ 60/605.1, 602, 599; 123/527–528, 123/184.45; 701/104

See application file for complete search history.

(56) References Cited

U.S. PATENT DOCUMENTS 6,463,907 B1 * 10/2002 Hiltner ......................... 123/304
6,805,107 B2 * 10/2004 Vinyard ........................ 123/525
(Continued)

FOREIGN PATENT DOCUMENTS

CN    1831318 A    9/2006
CN   101680397 A    3/2010
(Continued)

OTHER PUBLICATIONS

International Preliminary Report on Patentability issued Sep. 3, 2013 in corresponding International Application No. PCT/JP2011/072639.

(Continued)

*Primary Examiner* — Jorge Pereiro
*Assistant Examiner* — Jason T Newton
(74) *Attorney, Agent, or Firm* — Wenderoth, Lind & Ponack, L.L.P.

(57) ABSTRACT

An air supply device of a gas engine having a turbocharger includes a first intake passage configured to guide the mixture of outdoor air and unpurified gas into the turbocharger, a second intake passage configured to guide indoor air into the turbocharger, a filter configured to remove a solid impurity in the unpurified gas which is disposed in the first intake passage, a first damper capable of opening and closing the first intake passage disposed on the downstream side of the filter in the first intake passage, a heating unit for heating the indoor air disposed in the second intake passage, a second damper capable of opening and closing the second intake passage disposed on the downstream side of the heating unit in the second intake passage, and a damper control device configured to control the opening degree of each of the first and second dampers.

7 Claims, 4 Drawing Sheets

(51) Int. Cl.
*F02D 9/02* (2006.01)
*F02M 21/02* (2006.01)
*F02M 35/108* (2006.01)
*F02D 41/00* (2006.01)
*F02B 37/00* (2006.01)
*F02B 37/18* (2006.01)

(52) U.S. Cl.
CPC ...... *F02M 21/0215* (2013.01); *F02M 21/0227* (2013.01); *F02M 35/108* (2013.01); *F02B 29/0406* (2013.01); *F02B 37/00* (2013.01); *F02B 37/18* (2013.01); *F02D 2200/0402* (2013.01); *F02D 2200/703* (2013.01); *Y02T 10/144* (2013.01); *Y02T 10/32* (2013.01)

(56) References Cited

U.S. PATENT DOCUMENTS

| | | | |
|---|---|---|---|
| 7,958,866 B2* | 6/2011 | Thomas | 123/379 |
| 8,146,573 B2 | 4/2012 | Oohashi et al. | |
| 8,485,158 B2 | 7/2013 | Nishio et al. | |
| 8,851,054 B2* | 10/2014 | Malm | 123/527 |
| 2003/0029852 A1* | 2/2003 | Ozawa et al. | 219/205 |
| 2008/0147303 A1* | 6/2008 | Ito et al. | 701/111 |
| 2009/0287391 A1* | 11/2009 | Duineveld et al. | 701/103 |
| 2010/0031937 A1 | 2/2010 | Oohashi et al. | |
| 2010/0126170 A1 | 5/2010 | Nishio et al. | |
| 2012/0109499 A1* | 5/2012 | Klaser-Jenewein | 701/103 |
| 2013/0055712 A1* | 3/2013 | Shimizu et al. | 60/602 |
| 2013/0067913 A1* | 3/2013 | Nishio et al. | 60/599 |
| 2013/0220278 A1* | 8/2013 | Nishio et al. | 123/478 |
| 2014/0000255 A1* | 1/2014 | Suzuki et al. | 60/599 |

FOREIGN PATENT DOCUMENTS

| | | |
|---|---|---|
| JP | 55-6476 | 1/1980 |
| JP | 8-312400 | 11/1996 |
| JP | 2003-65032 | 3/2003 |
| JP | 2003-83181 | 3/2003 |
| JP | 2007-205293 | 8/2007 |
| JP | 2008-95567 | 4/2008 |
| JP | 2008-202520 | 9/2008 |
| JP | 2009-144626 | 7/2009 |
| KR | 10-2009-0086463 | 8/2009 |

OTHER PUBLICATIONS

International Search Report issued Nov. 1, 2011 in corresponding International Application No. PCT/JP2011/072639 (with English translation).
Decision to Grant a Patent issued Jun. 6, 2013 in corresponding Japanese Application No. 2011-043104 (with English translation).
First Office Action issued Feb. 2, 2015 in corresponding Chinese Application No. 201180067771.7 (with English translation).
Notice of Allowance issued Jul. 17, 2014 in corresponding Korean Application No. 10-2013-7021448 (with English translation).
Notification of Grant of Invention Patent issued Aug. 27, 2015 in corresponding Chinese Application No. 201180067771.7 (with English translation).

* cited by examiner

AIR SUPPLY DEVICE OF GAS ENGINE

TECHNICAL FIELD

The present invention relates to an air supply device of a gas engine having a turbocharger configured to turbocharge air or the mixture of the air and unpurified gas sucked into the gas engine.

BACKGROUND ART

There is widely known a gas engine system in which air supplied via a turbocharger and fuel gas are mixed, the mixture is supplied into a combustion chamber, and the mixture is ignited and combusted in the engine.

In the gas engine system, in a case where the gas engine is started from a state where the gas engine is cooled due to a low outside air temperature as in, e.g., wintertime, when outside air is used as the air mentioned above, the low-temperature outside air is sucked into the gas engine at the time of start of the gas engine, and hence there is a problem that the startability of the engine is reduced.

To cope with this, Patent Document 1 discloses a technology capable of preventing the reduction in startability in the case where the gas engine is started from the state where the gas engine is cooled due to the low outside air temperature as in wintertime. The technology disclosed in Patent Document 1 relates to the gas engine system in which the engine has a passage configured to guide outdoor air (outside air) into the engine and a passage configured to guide indoor air (inside air) into the engine, only the inside air is supplied into the engine and is also heated when the load of the engine is less than a specific value, and only the outside air is supplied into the engine when the load of the engine is not less than the specific value.

Patent Document 1: Japanese Patent Application Laid-open No. 2003-83181

Incidentally, in the gas engine system, there are cases where unpurified gas represented by VAM (Ventilation Air Methane) discharged from a mine (hereinafter referred to as unpurified gas) is used as air and fuel supplied to a turbocharger. The unpurified gas often contains a solid impurity such as dust or the like and, particularly when the unpurified gas is used as air and is supplied to the turbocharger together with outside air, the impurity causes the wear of a device or the abnormal combustion in the engine so that it is necessary to remove the impurity.

However, in the technology disclosed in Patent Document 1, as described above, although it is possible to suppress the reduction in startability in the case where the gas engine is started from the state where the gas engine is cooled due to the low outside air temperature as in wintertime, no consideration is given to a case where the unpurified gas is supplied to the turbocharger together with the outside air. As a result, when the technology disclosed in Patent Document 1 is applied to the case where the unpurified gas is supplied to the turbocharger together with the outside air, it is not possible to remove the impurity and there is a possibility that the impurity flows into the engine and the engine does not operate normally.

DISCLOSURE OF THE INVENTION

Therefore, in view of such a related art problem, an object of the present invention is to provide an air supply device of a gas engine which supplies the mixture of the outside air and the unpurified gas to the turbocharger and turbocharges the mixture thereof using the turbocharger, and is capable of preventing the reduction in startability in the case where the gas engine is started from the state where the gas engine is cooled due to the low outside air temperature as in wintertime and removing the impurity contained in the unpurified gas to prevent the impurity from flowing into the engine.

In order to solve the above problem, an air supply device of a gas engine in the present invention is an air supply device of a gas engine having a turbocharger including a first intake passage configured to guide a mixture of outdoor air and unpurified gas into the turbocharger, a second intake passage configured to guide indoor air into the turbocharger, a filter configured to remove a solid impurity in the unpurified gas being disposed in the first intake passage, a first damper capable of opening and closing the first intake passage being disposed on a downstream side of the filter in the first intake passage, a heating unit for heating the indoor air being disposed in the second intake passage, a second damper capable of opening and closing the second intake passage being disposed on a downstream side of the heating unit in the second intake passage, and a damper control device configured to control an opening degree of each of the first and second dampers.

With this, at the time of start of the engine, in an indoor air temperature or an outdoor air temperature, it is possible to switch between supply of air or the mixture within the temperature range which does not reduce the startability of the engine to the turbocharger and supply of the indoor air to the turbocharger in a case where the outdoor air temperature falls within the temperature range which reduces the startability of the engine. Consequently, even in a case where the gas engine is started from a state where the gas engine is cooled due to a low outside air temperature as in wintertime, it is possible to suppress a reduction in the startability of the engine.

In addition, by providing the filter, it is possible to collect the impurity contained in the unpurified gas and remove the impurity contained in the unpurified gas to prevent the impurity from flowing into the engine.

Additionally, the air supply device of a gas engine may further include an outdoor air temperature gauge configured to detect a temperature of the mixture of the outdoor air and the unpurified gas, and an indoor air temperature gauge configured to detect a temperature of the indoor air, and the damper control device may include a temperature determination section configured to determine whether a first condition in which a temperature of the outdoor air is lower than a predetermined specific temperature and the temperature of the indoor air is higher than the temperature of the outdoor air is satisfied or a second condition in which the temperature of the outdoor air is higher than the predetermined specific temperature or the temperature of the outdoor air is higher than the temperature of the indoor air is satisfied, and a damper opening degree control section, based on the determination of the temperature determination section, configured to close the first damper and open the second damper when the first condition is satisfied, and configured to open the first damper and close the second damper when the second condition is satisfied.

Further, the temperature determination section may be configured to determine whether a third condition in which the temperature of the outdoor air is higher than the predetermined specific temperature and is lower than a second specific temperature predetermined so as to be higher than the specific temperature is satisfied, a fourth condition in which the temperature of the outdoor air is higher than the second specific temperature and is lower than the temperature of the indoor air is satisfied, or a fifth condition in which the temperature of the outdoor air is higher than the second specific temperature and is higher than the temperature of the indoor air is satisfied, and the damper opening degree control section may be configured to open the first damper and close the second damper when the third condition or the fourth condition is satisfied based on the determination of the temperature determination section, and may be configured to close the first damper and open the second damper when the fifth condition is satisfied based on the determination of the temperature determination section.

With this, at the time of start of the engine, it is possible to supply, to the turbocharger, the mixture of the outdoor air and the unpurified gas in a case where the outdoor air temperature falls within the temperature range which does not reduce the startability of the engine, and one of the mixture of the outdoor air and the unpurified gas and the indoor air which is smaller in the degree of reduction of the startability than the other in the case where the outdoor air temperature falls within the temperature range which reduces the startability of the engine. Consequently, even in the case where the gas engine is started from the state where the gas engine is cooled due to the low outside air temperature as in wintertime, it is possible to suppress the reduction in the startability of the engine.

Further, it is sufficient to suck in the indoor air only at the time of start thereof, and hence it is possible to secure a long time period when the unpurified gas is sucked in together with the outdoor air.

In addition, the damper opening degree control section may include a damper operation delay unit configured to close the first damper on condition that the second damper is opened when the first condition is satisfied, and configured to close the second damper on condition that the first damper is opened when the second condition is satisfied.

With this, when the switching of opening and closing of the first damper and the second damper is performed, it is possible to prevent the occurrence of a state where both of the first and second dampers are closed and intake air is not supplied to the turbocharger. Consequently, it is possible to prevent the occurrence of surging of the turbocharger resulting from suspension of the supply of the intake air to the turbocharger.

Further, the air supply device of a gas engine may further include a pressure difference detection unit configured to detect a pressure difference between an upstream side and the downstream side of the filter, and the damper control device may be configured to open the second damper when the pressure difference is not less than a predetermined specific pressure difference, and may be configured to close the second damper when the pressure difference is less than the predetermined specific pressure difference.

With this, it is possible to prevent the surging of the turbocharger caused by an increase in back pressure to the turbocharger disposed on the downstream side of the filter resulting from secular clogging of the filter caused by the collection of the impurity.

Moreover, the air supply device of a gas engine may further include a rotation rate gauge configured to detect a rotation rate of the turbocharger, an intake air amount gauge configured to detect an intake air amount supplied to the turbocharger, a pressure gauge configured to detect a pressure of air turbocharged by the turbocharger (a supplied air pressure), and a pressure ratio calculation unit for calculating a pressure ratio based on a detected value of the pressure gauge and an atmospheric pressure, the pressure ratio being between the supplied air pressure and the atmospheric pressure, and the pressure difference detection unit may include a pressure difference map configured to store a relationship of the rotation rate of the turbocharger, the intake air amount supplied to the turbocharger, and the pressure ratio between the pressure of the air turbocharged by the turbocharger (the supplied air pressure) and the atmospheric pressure, the pressure difference map being pre-generated on condition that there is no increase in the pressure difference of the filter, and a pressure difference determination section configured to determine that the pressure difference is not less than the predetermined specific pressure difference when the rotation rate of the turbocharger detected by the rotation rate gauge is larger than the rotation rate of the turbocharger determined from the map on conditions of the intake air amount detected by the intake air amount gauge and the pressure ratio calculated by the pressure ratio calculation unit by a predetermined specific amount or more.

Normally, the air supply system of the gas engine is provided with the rotation rate gauge, the intake air amount gauge, and the pressure gauge, and hence it becomes possible to implement the invention without providing an additional gauge.

In addition, the gas engine may be configured to use coal mine methane as fuel, and the unpurified gas may include VAM (Ventilation Air Methane) discharged from a mine.

With this, also in the gas engine which uses the coal mine methane as the fuel and utilizes VAM as the unpurified gas, it becomes possible to prevent the reduction in startability in the case where the gas engine is started from the state where the gas engine is cooled due to the low outside air temperature as in wintertime and remove the impurity contained in the unpurified gas to prevent the impurity from flowing into the engine.

According to the present invention, it is possible to provide the air supply device of the gas engine which supplies the mixture of the outside air and the unpurified gas to the turbocharger and turbocharges the mixture thereof using the turbocharger, and is capable of preventing the reduction in startability in the case where the gas engine is started from the state where the gas engine is cooled due to the low outside air temperature as in wintertime and removing the impurity contained in the unpurified gas to prevent the impurity from flowing into the engine.

BEST MODE FOR CARRYING OUT THE INVENTION

Hereinbelow, a preferred embodiment of the present invention will be illustratively described in detail with reference to the drawings. However, the scope of the present invention is not limited only to dimensions, materials, shapes, and relative arrangements of constituent parts described in the embodiment unless specifically described, and it is merely an illustrative example.

Figure 1:
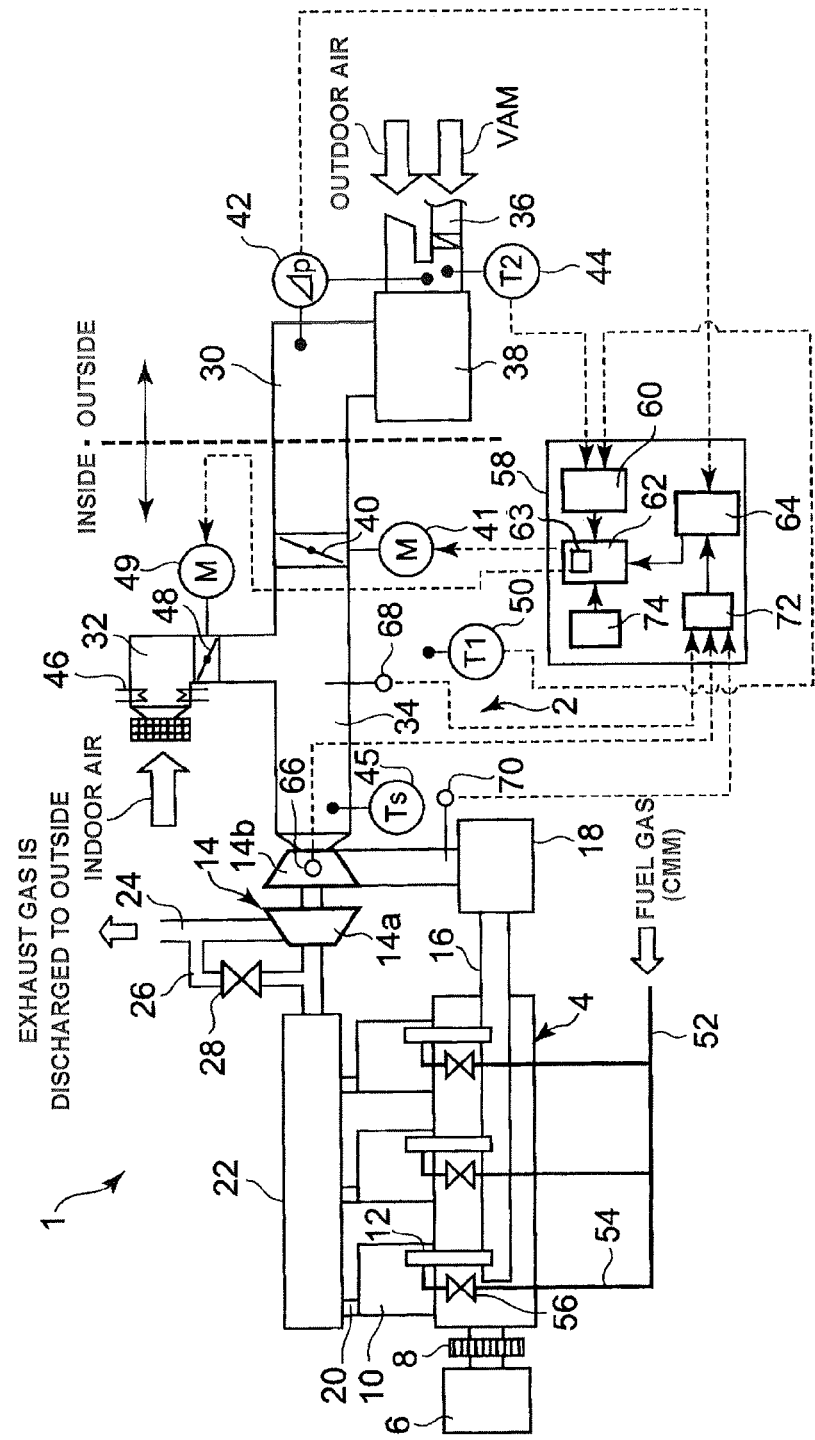
FIG. 1 is a block diagram showing the entire configuration of a gas engine system including an air supply device of a gas engine according to an embodiment.
Figure 2:
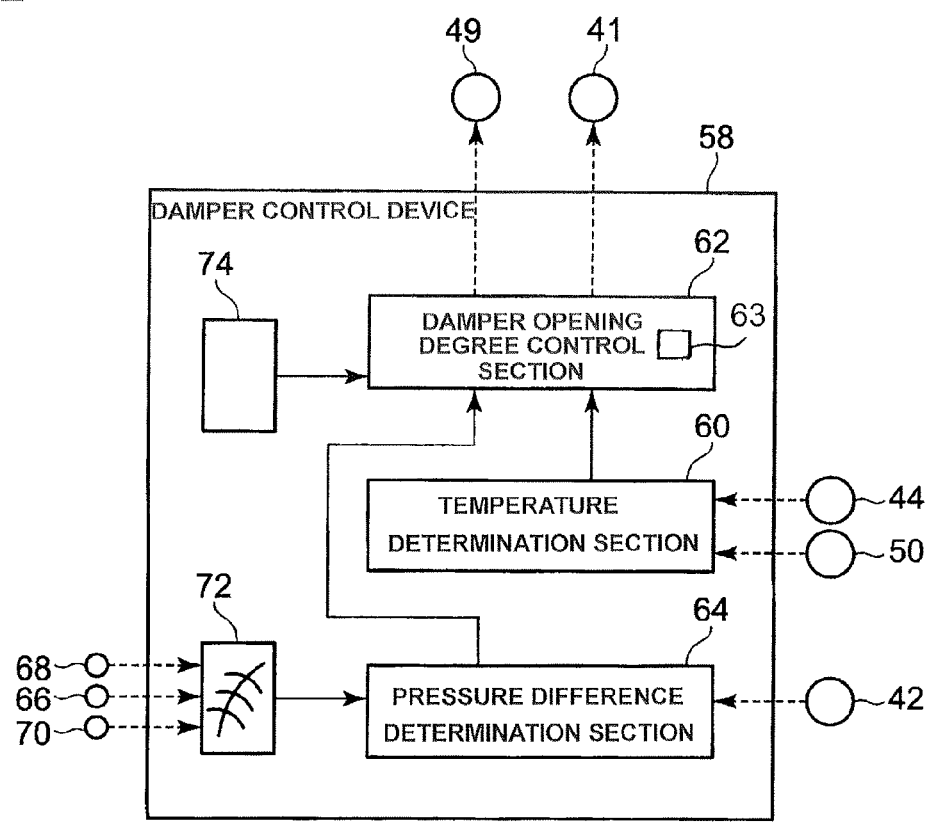
FIG. 2 is a block diagram showing the configuration of a damper control device in the embodiment.

FIG. 1 is a block diagram showing the entire configuration of a gas engine system including an air supply device of a gas engine according to an embodiment, while FIG. 2 is a block diagram showing the configuration of a damper control device in the embodiment.

First, with reference to FIGS. 1 and 2, a description will be given of the entire configuration of the gas engine system according to the present embodiment. In FIG. 1, the reference numeral 4 denotes an engine (gas engine), the reference numeral 6 denotes a generator directly driven by the engine, and the reference numeral 8 denotes a flywheel. In addition, the reference numeral 14 denotes a turbocharger including an exhaust gas turbine 14a and a compressor 14b.

The reference numeral 10 denotes cylinder heads of the engine 4.

An air supply branch pipe 12 is connected to the air supply inlet of each cylinder head 10. The air supply outlet of the compressor 14b and each air supply branch pipe 12 are connected with an air supply pipe 16, and an air cooler 18 configured to cool supplied air flowing in the air supply pipe 16 is disposed in the air supply pipe 16.

In addition, a plurality of exhaust pipes 20 are connected to the exhaust outlets of the individual cylinder heads 10, and the plurality of exhaust pipes 20 are connected to an exhaust collection pipe 22. An exhaust outlet pipe 24 for discharging exhaust gas from the exhaust gas outlet of the exhaust gas turbine 14a is connected to the exhaust collection pipe 22. The exhaust outlet pipe 24 is provided with an exhaust bypass path 26 which bypasses the exhaust gas turbine 14a. The exhaust bypass path 26 branches from the inlet side of the exhaust gas turbine 14a of the exhaust collection pipe 22, bypasses the exhaust gas turbine 14a, and is connected to the exhaust outlet pipe 24 on the outlet side of the exhaust gas turbine 14a. The exhaust bypass path 26 is provided with an exhaust bypass valve 28 configured to open and close the exhaust bypass path 26.

There are provided a first intake passage 30 and a second intake passage 32 for introducing air into the compressor 14b of the turbocharger 14 from the outside. The first intake passage 30 and the second intake passage 32 are combined to form a combined passage 34, and the combined passage 34 is connected to the inlet side of the turbocharger 14.

As shown in FIG. 1, the inlet of the first intake passage 30 is disposed outside, outdoor air is introduced into the first intake passage 30 through the inlet thereof, and a VAM introduction pipe 36 is connected to the inlet thereof such that VAM (Ventilation Air Methane) as unpurified gas can be introduced from the outside. Herein, VAM is one type of low-concentration coal mine methane which is a gas released into the air through a ventilation system for securing safety in a mine, and the methane concentration thereof is about 0.3 to 0.7%. That is, the first intake passage 30 is provided in order to prepare the mixture of the outdoor air and VAM and supply the mixture thereof to the compressor 14b of the turbocharger 14 via the combined passage 34.

The first intake passage 30 is provided with an intake filter 38, and a first damper 40 for opening and closing the first intake passage 30 which is driven by a motor 41 is disposed on the downstream side of the intake filter 38. In addition, there is provided a pressure difference gauge 42 configured to detect a pressure difference Δp between the upstream side and the downstream side of the intake filter 38. Further, there is provided an outdoor air temperature gauge 44 configured to detect the temperature of the mixture (hereinafter referred to as an outdoor intake air temperature) T2. Furthermore, there is provided a combined passage temperature gauge 45 configured to detect the temperature in the combined passage 34.

In addition, as shown in FIG. 1, the inlet of the second intake passage 32 is disposed inside, and indoor air is introduced into the second intake passage 32.

The second intake passage 32 is provided with a heater 46 for heating the introduced indoor air, and a second damper 48 for opening and closing the second intake passage 32 which is driven by a motor 49 is disposed on the downstream side of the heater 46.

Further, an indoor air temperature gauge 50 for detecting an indoor air temperature T1 of the indoor air introduced into the second intake passage 32 is disposed inside at the outside of the second intake passage 32.

The reference numeral 52 denotes a gas supply pipe into which fuel gas is introduced. Gas supply branch pipes 54 for the individual cylinders branch out from the gas supply pipe 52 and the gas supply branch pipes 54 are connected to the air supply branch pipes 12. Note that the reference numeral 56 denotes a fuel flow control valve which is disposed in each gas supply branch pipe 54 and is configured to control the passage area of each gas supply branch pipe 56, i.e., a fuel gas flow thereof. As the fuel gas, CMM (Coal Mine Methane) as the unpurified gas is used. Herein, CMM is a gas collected by gas draining during mining, and the methane concentration thereof is about 30 to 50%.

Further, there is provided a damper control device 58 for controlling the opening degree of each of the dampers 40 and 48. The damper control device 58 has a temperature determination section 60, a damper opening degree control section 62, and a pressure difference determination section 64. The temperature determination section 60, the damper opening degree control section 62, and the pressure difference determination section 64 will be described later.

During the operation of the gas engine having the above configuration, air from the combined passage 34 is introduced into the compressor 14b. The air having high temperature and pressure resulting from pressurization by the compressor 14b is cooled in the air cooler 18 and flows into the air supply branch pipe 12 of each cylinder through the air supply pipe 16.

On the other hand, the fuel gas (CMM) enters into each air supply branch pipe 12 through the gas supply pipe 52 and each gas supply branch pipe 54, is mixed into the air in the air supply branch pipe 12, and is sent into each cylinder, whereby the engine 4 and the generator 6 are driven.

Then, exhaust gas from each cylinder of the engine 4 is collected in the exhaust collection pipe 22 through the exhaust pipes 20, supplied to the exhaust gas turbine 14a of the turbocharger 14 to drive the exhaust gas turbine 14a, and discharged to the outside through the exhaust outlet pipe 24. When the exhaust bypass valve 28 is opened according to the required ability of the compressor 14b, a part of the exhaust gas in the exhaust collection pipe 22 bypasses the exhaust gas turbine 14a and is discharged to the exhaust outlet pipe 24.

Next, a description will be given of the control operation of the dampers 40 and 48, i.e., the control operation of air supplied to the compressor 14b of the turbocharger 14 with reference to FIG. 3.

Figure 3:
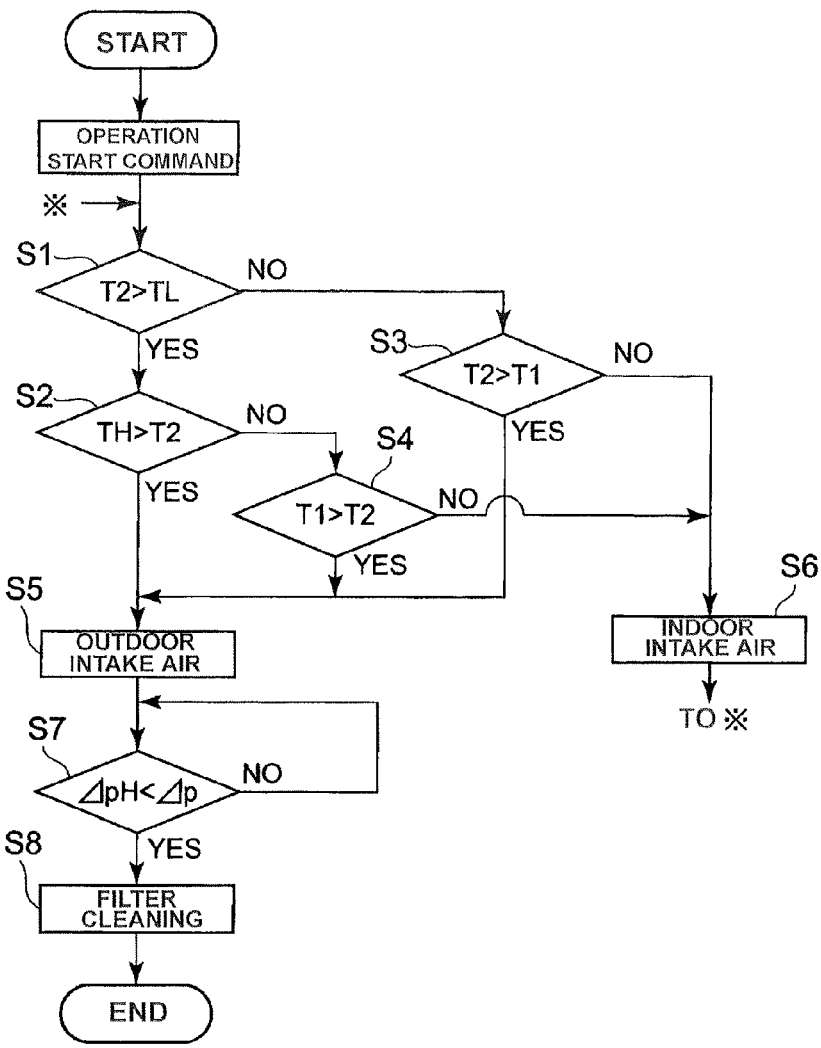
FIG. 3 is a flowchart related to the control operation of opening and closing a first damper and a second damper from the time of start of an engine to the time of continuous operation thereof.

FIG. 3 is a flowchart related to the control operation of opening and closing the first damper 40 and the second damper 48 from the time of start of the engine 4 to the time of continuous operation thereof, and also related to the control operation of the damper control device 58.

When a start command of the engine 4 is issued, the flow advances to Step S1.

In Step S1, in the temperature determination section 60, it is determined whether or not the outdoor intake air temperature T2 is higher than an intake air switching range temperature TL, The flow advances to Step S2 when YES is determined in Step S1, and the flow advances to Step S3 when NO is determined in Step S1.

Herein, the intake air switching range temperature TL denotes a temperature at which the intake air temperature is tow and the startability of the engine is reduced in a case where the outdoor intake air temperature T2 is not more than the intake air switching range temperature TL, and is a temperature individually determined for each engine based on the performance of the engine 4.

In Step S2, in the temperature determination section 60, it is determined whether or not the outdoor intake air temperature T2 is less than an intake air switching range temperature TH. In a case where YES is determined in Step S2, i.e., the outdoor intake air temperature T2 satisfies T<T2<TH, the flow advances to Step S5. In a case where NO is determined in Step S2, i.e., the outdoor intake air temperature T2 satisfies T2>TH, the flow advances to Step S4.

Herein, the intake air switching range temperature TH denotes a temperature at which the intake air temperature is high and the startability of the engine is reduced in a case where the outdoor intake air temperature T2 is not less than the intake air switching range temperature TH, satisfies TH>TL, and is a temperature individually determined for each engine based on the performance of the engine 4.

In Step S3, in the temperature determination section 60, it is determined whether or not the outdoor intake air temperature T2 is higher than the indoor intake air temperature T1. In a case where YES is determined in Step S3, i.e., the outdoor intake air temperature T2 satisfies T2<TL and T2>T1, the flow advances to Step S5. In a case where NO is determined in Step S3, i.e., the outdoor intake air temperature T2 satisfies T2<TL and T2<T1, the flow advances to Step S6.

In Step S4, in the temperature determination section 60, it is determined whether or not the indoor intake air temperature T1 is higher than the outdoor intake air temperature T2. In a case where YES is determined in Step S4, i.e., the outdoor intake air temperature T2 satisfies TH<T2 and T1>T2, the flow advances to Step S5. In a case where NO is determined in Step S4, i.e., the outdoor intake air temperature T2 satisfies TH<T2 and T1<T2, the flow advances to Step S6.

In summary, in Steps S1 to S4, in the case where the outdoor intake air temperature T2 satisfies TL<T2<TH, T2>TH and T1>T2, or T2<TL and T2>T1, the flow advances to Step S5. In the case where the outdoor intake air temperature T2 satisfies T2<TL and T2<T1, or TH<T2 and T1<T2, the flow advances to Step S6.

When the flow advances to Step S5, the damper opening degree control section 62 controls the motor 49 to close the damper 48 in a case where the damper 40 is opened by using a damper operation delay unit 63 provided therein. In a case where the damper 40 is not opened, the damper opening degree control section 62 controls the motor 41 to open the damper 40, and then controls the motor 49 to close the damper 48.

With this operation, the mixture of the outdoor air and VAM is supplied to the compressor 14b constituting the turbocharger 14 through the first intake passage 30 and the combined passage 34 via the filter 38 and the damper 40.

In addition, by closing the damper 48 after opening the damper 40, it is possible to prevent the occurrence of a state where both of the damper 40 and the damper 48 are closed and the intake air is not supplied to the turbocharger.

When the mixture of the outdoor air and VAM is supplied to the compressor 14b in Step S5, the flow advances to Step S7.

In Step S7, the pressure difference determination section 64 determines whether or not the fore-and-aft pressure difference Δp of the intake filter 38 is higher than an intake filter cleaning request pressure difference ΔpH based on the detected value of the pressure difference gauge 42. Herein, the fore-and-aft pressure difference of the intake filter is increased by the presence of the impurity collected by the intake filter, and the lower limit of the fore-and-aft pressure difference of the intake filter when the accumulation amount of the collected impurity is increased and the cleaning of the intake filter is required is the intake filter cleaning request pressure difference ΔpH.

In a case where YES is determined in Step S7, i.e., the fore-and-aft pressure difference Δp of the intake filter 38 exceeds the intake filter cleaning request pressure difference ΔpH, the flow advances to Step S8 and, in a case where the fore-and-aft pressure difference Δp thereof does not exceed the intake filter cleaning request pressure difference ΔpH, the operation is continued until the fore-and-aft pressure difference Δp thereof exceeds the intake filter cleaning request pressure difference ΔpH.

In Step S8, the damper opening degree control section 62 controls the motor 41 to close the damper 40. With this operation, the supply of the mixture of the outdoor air and VAM to the compressor 14b is suspended, the flow of the mixture of the outdoor air and VAM through the intake filter 38 is stopped, and it becomes possible to perform the cleaning of the intake filter.

Note that, when the supply of the mixture of the outdoor air and VAM to the compressor 14b is suspended in Step S8, it is also possible to supply the indoor air to the compressor 14b by opening the damper 48. In this case, it becomes possible to perform the cleaning of the intake filter 38 without stopping the operation of the engine 4.

On the other hand, in Step S6, the damper opening degree control section 62 controls the motor 41 to close the damper 40 in a case where the damper 48 is opened by using the damper operation delay unit 63 provided therein. In a case where the damper 48 is not opened, the damper opening degree control section 62 controls the motor 49 to open the damper 48, and then controls the motor 41 to close the damper 40.

With this operation, the indoor air is heated by the heater 46 and is supplied to the compressor 14b constituting the turbocharger 14 through the second intake passage 32 and the combined passage 34 via the damper 48.

When the indoor air is supplied to the compressor 14b in Step S6, the flow returns to Step S1.

According to the configuration and operations described above, at the time of start of the engine 4, it is possible to supply, to the compressor 14b, the mixture of the outdoor air and VAM in a case where the outdoor intake air temperature T2 falls within the temperature range which does not reduce the startability of the engine 4, and one of the mixture of the outdoor air and VAM and the indoor air which is smaller in the degree of reduction of the startability than the other in a case where the outdoor intake air temperature T2 falls within the temperature range which reduces the startability of the engine 4.

With this arrangement, even in a case where the gas engine is started from a state where the gas engine is cooled due to a low outside air temperature as in wintertime, it is possible to suppress a reduction in the startability of the engine.

In addition, in the case where the outdoor intake air temperature T2 falls within the temperature range which does not reduce the startability of the engine 4, by introducing the mixture of the outdoor air and VAM, it is possible to prolong the introduction time period of the mixture of the outdoor air and VAM within the range which does not reduce the startability of the engine 4 at the time of start of the engine 4. With this, it is possible to dispose VAM as much as possible.

Further, it becomes possible to collect the impurity contained in VAM by providing the intake filter 38 and, by closing the damper 40 in response to an increase in the pressure difference of the intake filter 38, it is possible to prevent surging of the turbocharger 14 caused by an increase in back pressure to the turbocharger 14 disposed on the downstream side of the intake filter 38 resulting from secular clogging of the intake filter 38 caused by the collection of the impurity.

Furthermore, as described above, even during the cleaning of the intake filter 38, it becomes possible to perform the cleaning of the intake filter 38 without stopping the operation of the engine 4 by opening the damper 48 to supply the indoor air to the compressor 14b.

Moreover, even when the cleaning of the intake filter 38 is not performed, in a case where the air supply amount from the first intake passage is reduced due to secular degradation of the intake filter 38, it is possible to supply the intake air which compensates for the reduction in air supply amount by opening the second damper 48. With this, the turbocharger can be operated constantly at the optimum efficiency without being affected by the secular degradation of the intake filter.

Figure 4:
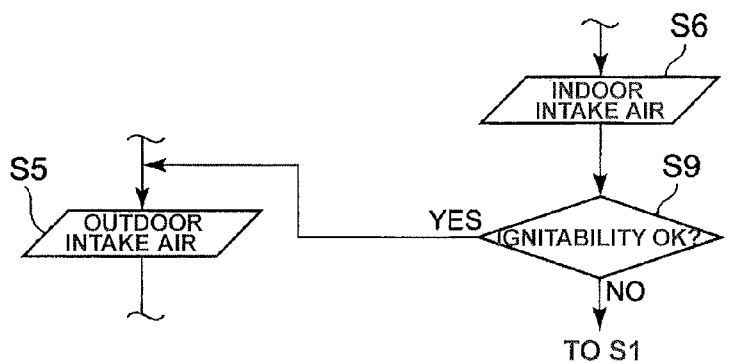
FIG. 4 is a flowchart of another example related to the control operation of opening and closing the first damper and the second damper from the time of start of the engine to the time of continuous operation thereof.

Further, it is also possible to use the procedures of a flowchart shown in FIG. 4 in the control operation of the damper control device 58.

FIG. 4 is the flowchart of another example related to the control operation of opening and closing the first damper 40 and the second damper 48 from the time of start of the engine 4 to the time of continuous operation thereof in the embodiment. FIG. 4 is identical with FIG. 3 except that Step S9 is provided, and hence the depiction of the part other than the part related to Step S9 will be omitted and the description thereof will also be omitted.

In FIG. 4, when the indoor intake air is supplied to the turbocharger in Step S6, the engine 4 is started with the supply of the fuel.

In Step S9, by an ignitability determination unit which is additionally provided, it is determined whether or not sufficient ignitability is secured by monitoring an output, a combustion chamber pressure, and other temperatures.

When YES is determined in Step S9, i.e., it is determined that the ignitability is sufficient, the damper opening degree control section 62 closes the damper 48 in the case where the damper 40 is opened, and closes the damper 48 after opening the damper 40 in the case where the damper 40 is closed.

When NO is determined in Step S9, i.e., it is determined that the ignitability is not sufficient, the flow returns to Step S1.

By providing Step S9 in which it is determined whether or not the ignitability is sufficient, it is possible to secure a long time period when the mixture of the outdoor air and VAM is supplied to the turbocharger, and dispose much VAM.

Further, as shown in FIGS. 1 and 2, it is possible to provide a calendar mechanism 74. Although the calendar mechanism 74 is disposed in the damper control device 58 in FIGS. 1 and 2, the calendar mechanism 74 may also be disposed at other positions as long as it can send signals to the damper opening degree control section 62.

In this case, a present date and time is sent to the temperature determination section from the calendar mechanism 74.

Subsequently, in the flowchart shown in FIG. 3, in the case where NO is determined in Step S1, i.e., T2<TL is satisfied, it is determined whether or not the present date and time corresponds to a specific date and time in addition to Step S3. Then, when the present date and time corresponds to the specific date and time, the flow advances to Step S6 irrespective of the result of Step S3. Herein, the specific date and time denotes a date and time when a pre-set outside air temperature is expected to be low, and corresponds to, e.g., midnight or early morning in wintertime.

By providing the calendar mechanism 74, it is possible to prevent frequent switching between the damper 40 and the damper 48 at the specific date and time when there is a high possibility that the indoor air is used.

Furthermore, in the present embodiment, although the increase in the fore-and-aft pressure difference of the intake filter 38 is determined by using the pressure difference gauge 42, it is possible to determine the increase in the fore-and-aft pressure difference of the intake filter 38 by using a map 72 instead of or together with the pressure difference gauge 42.

In this case, there are provided an rotation rate gauge 66 configured to detect the rotation rate of the compressor 14b constituting the turbocharger 14, an air amount gauge 68 configured to detect the air amount supplied to the turbocharger 114, and a pressure gauge 70 configured to detect the pressure of air turbocharged by the turbocharger 14 (supplied air pressure) Subsequently, by using the map 72 which is pre-generated on condition that there is no increase in the pressure difference of the filter and stores the relationship of the rotation rate of the turbocharger 14, the air amount supplied to the turbocharger 14, and a pressure ratio between the pressure of the air turbocharged by the turbocharger 14 (supplied air pressure) and an atmospheric pressure, the pressure difference determination section 64 determines that the pressure difference is not less than a predetermined specific pressure difference when the rotation rate of the turbocharger detected by the rotation rate gauge is larger than the rotation rate of the turbocharger determined from the map 72 on conditions of the air amount detected by the air amount gauge and the pressure ratio calculated by the pressure ratio calculation unit by a predetermined specific amount or more.

Figure 5:
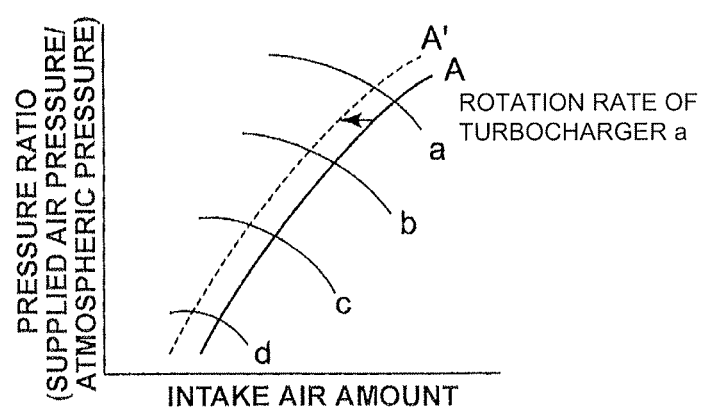
FIG. 5 shows one example of a map used in a pressure difference determination of an intake filter in the embodiment.

FIG. 5 shows one example of the map used in the pressure difference determination of the intake filter in the embodiment. In FIG. 5, the vertical axis indicates the pressure ratio (supplied air pressure/atmospheric pressure), the horizontal axis indicates the air amount supplied to the turbocharger, and each of a to d indicates the rotation rate of the turbocharger. In the map shown in FIG. 5, for example, a line indicated by A indicative of the relationship of the pressure ratio, the air amount, and the rotation rate of the turbocharger in the case where there is no increase in the pressure difference of the intake filter 38 shifts to match a line indicated by A' by the increase in the pressure difference of the intake filter. With this, it is possible to determine the increase in the pressure difference of the intake filter 38.

In a case where the map shown in FIG. 5 is used, the air supply system of the engine is normally provided with the rotation rate gauge 66, the air amount gauge 68, and the pressure gauge 70, and hence it becomes possible to implement the invention without providing an additional gauge.

INDUSTRIAL APPLICABILITY

The present invention can be used as an air supply device of a gas engine which supplies the mixture of outside air and unpurified gas to a turbocharger and turbocharges the mixture thereof using the turbocharger, and is capable of preventing a reduction in startability in a case where the gas engine is started from a state where the gas engine is cooled due to a low outside air temperature as in wintertime, and removing an impurity contained in the unpurified gas to prevent the impurity from flowing into the engine.

The invention claimed is:

1. An air supply device of a gas engine, which is located in a facility provided at a gas source, including a turbocharger, comprising:
   a first intake passage configured to guide a mixture of outdoor air obtained from outside of the gas source and unpurified gas discharged from the gas source into the turbocharger;
   a second intake passage configured to guide indoor air obtained from an inside of the facility into the turbocharger;
   a filter configured to remove a solid impurity in the unpurified gas, the filter being disposed in the first intake passage;
   a first damper capable of opening and closing the first intake passage, the first damper being disposed on a downstream side of the filter in the first intake passage;
   a heating unit for heating the indoor air, the heating unit being disposed in the second intake passage;
   a second damper capable of opening and closing the second intake passage, the second damper being disposed on a downstream side of the heating unit in the second intake passage; and
   a damper control device configured to control an opening degree of each of the first damper and the second damper.

2. The air supply device of a gas engine according to claim 1, further comprising:
   an outdoor air temperature gauge configured to detect a temperature of the mixture of the outdoor air and the unpurified gas; and
   an indoor air temperature gauge configured to detect a temperature of the indoor air,
   wherein the damper control device comprises:
   a temperature determination section configured to determine whether a first condition in which a temperature of the outdoor air is lower than a predetermined specific temperature and the temperature of the indoor air is higher than the temperature of the outdoor air is satisfied or a second condition in which the temperature of the outdoor air is higher than the predetermined specific temperature or the temperature of the outdoor air is higher than the temperature of the indoor air is satisfied; and
   a damper opening degree control section, based on the determination of the temperature determination section, configured to close the first damper and open the second damper when the first condition is satisfied, and configured to open the first damper and close the second damper when the second condition is satisfied.

3. The air supply device of a gas engine according to claim 2, wherein:
   the predetermined specific temperature is a first predetermined specific temperature,
   the temperature determination section is configured to determine whether a third condition in which the temperature of the outdoor air is higher than the first predetermined specific temperature and is lower than a second predetermined specific temperature set so as to be higher than the first predetermined specific temperature is satisfied, a fourth condition in which the temperature of the outdoor air is higher than the second predetermined specific temperature and is lower than the temperature of the indoor air is satisfied, or a fifth condition in which the temperature of the outdoor air is higher than the second predetermined specific temperature and is higher than the temperature of the indoor air is satisfied, and
   the damper opening degree control section is configured to open the first damper and close the second damper when the third condition or the fourth condition is satisfied based on the determination of the temperature determination section, and is configured to close the first damper and open the second damper when the fifth condition is satisfied based on the determination of the temperature determination section.

4. The air supply device of a gas engine according to claim 2, wherein the damper opening degree control section comprises a damper operation delay unit configured to close the first damper on condition that the second damper is opened when the first condition is satisfied, and configured to close the second damper on condition that the first damper is opened when the second condition is satisfied.

5. The air supply device of a gas engine according to claim 1, further comprising a pressure difference detection unit configured to detect a pressure difference between an upstream side and the downstream side of the filter,
   wherein the damper control device is configured to open the second damper when the pressure difference is not less than a predetermined specific pressure difference, and is configured to close the second damper when the pressure difference is less than the predetermined specific pressure difference.

6. The air supply device of a gas engine according to claim 5, further comprising:
   a rotation rate gauge configured to detect a rotation rate of the turbocharger;
   an intake air amount gauge configured to detect an intake air amount supplied to the turbocharger,
   a pressure gauge configured to detect a pressure of air turbocharged by the turbocharger which is a supplied air pressure; and
   a pressure ratio calculation unit for calculating a pressure ratio based on a detected value of the pressure gauge and an atmospheric pressure, the pressure ratio being between the supplied air pressure and the atmospheric pressure,
   wherein the pressure difference detection unit comprises:
   a pressure difference map configured to store a relationship of the rotation rate of the turbocharger, the intake air amount supplied to the turbocharger, and the pressure ratio between the supplied air pressure and the atmospheric pressure, the pressure difference map being pre-generated on condition that there is no increase in the pressure difference of the filter; and
   a pressure difference determination section configured to determine that the pressure difference is not less than the predetermined specific pressure difference when the rotation rate of the turbocharger detected by the rotation rate gauge is larger than the rotation rate of the turbocharger determined from the pressure difference map on conditions of the intake air amount detected by the intake air amount gauge and the pressure ratio calculated by the pressure ratio calculation unit by a predetermined specific amount or more.

7. The air supply device of a gas engine according to claim 1, wherein
   the gas engine is configured to use coal mine methane as fuel, and
   the unpurified gas comprises VAM (Ventilation Air Methane) discharged from a mine.

* * * * *